United States Patent
Chen et al.

(10) Patent No.: US 6,940,725 B2
(45) Date of Patent: Sep. 6, 2005

(54) HEAT SINK ASSEMBLY

(75) Inventors: Wei-Yao Chen, Taoyuan Hsien (TW); Yin-Yuan Chen, Taoyuan Hsien (TW)

(73) Assignee: Delta Electronics, Inc., Hsien (TW)

( * ) Notice: Subject to any disclaimer, the term of this patent is extended or adjusted under 35 U.S.C. 154(b) by 0 days.

(21) Appl. No.: 10/729,743

(22) Filed: Dec. 5, 2003

(65) Prior Publication Data

US 2004/0264143 A1 Dec. 30, 2004

(30) Foreign Application Priority Data

Jun. 18, 2003 (TW) .................................. 92211130 U

(51) Int. Cl.$^7$ ................................................ H05K 7/20
(52) U.S. Cl. .................... 361/719; 361/704; 361/707; 174/252
(58) Field of Search .............................. 361/689, 690, 361/704, 707, 718–721; 257/706, 712; 174/16.1, 16.3, 252; 165/80.3, 185

(56) References Cited

U.S. PATENT DOCUMENTS

| | | | | |
|---|---|---|---|---|
| 4,409,641 A | * | 10/1983 | Jakob et al. | ................ 361/720 |
| 5,172,756 A | * | 12/1992 | Jayamanne et al. | ......... 165/80.3 |
| 5,191,512 A | * | 3/1993 | Ogura et al. | ................. 361/720 |
| 5,369,879 A | * | 12/1994 | Goeschel et al. | ............. 29/837 |
| 5,754,401 A | * | 5/1998 | Saneinejad et al. | ......... 361/705 |
| 5,940,272 A | * | 8/1999 | Emori et al. | ................. 361/704 |
| 6,377,462 B1 | * | 4/2002 | Hajicek et al. | ............. 361/719 |

FOREIGN PATENT DOCUMENTS

JP             04113695 A   *  4/1992   ............ H05K/7/20

* cited by examiner

*Primary Examiner*—Boris Chérvinsky
(74) *Attorney, Agent, or Firm*—Madson & Metcalf

(57) ABSTRACT

A heat sink assembly for use in an electrical apparatus having a printed circuit board having an electromagnetic device is disclosed. The heat sink assembly comprises a first heat-dissipating piece disposed between the electromagnetic device and the printed circuit board for transferring the heat generated from the electromagnetic device away the printed circuit board, and a second heat-dissipating piece disposed on the edge of the printed circuit board and contacting with the first heat-dissipating piece for transferring the heat from the first heat-dissipating piece away the printed circuit board.

10 Claims, 3 Drawing Sheets

HEAT SINK ASSEMBLY

FIELD OF THE INVENTION

The present invention relates to a heat sink assembly, and more particularly to a heat sink assembly for transferring the heat generated from an electromagnetic device on a printed circuit board to a case of an electrical apparatus.

BACKGROUND OF THE INVENTION

The power adapter is an essential electrical apparatus for providing required power to various electronic appliance or informational product, such as notebook, to work. Accompanying with the tendency of minimizing the volume of the electronic appliance or informational product, the power adapter is also designed and developed in small size and with high power efficiency. Accordingly, it becomes more and more important for the manufacturer to deal with the issue of heat dissipation of the power adapter. Generally, there are many electronic devices and electromagnetic devices, such as transformer, disposed on a printed circuit board of the power adapter. These devices will generate a great amount of heat that may cause the internal temperature of the power adapter to be higher and higher, when these devices operate. If the heat is accumulated within the interior of the power adapter and can't be removed efficiently, it will influence the operation efficiency of the power adapter.

Referring to FIG. 1, a conventional heat sink assembly disposed on a printed circuit board of a power adapter is shown. In FIG. 1, the power adapter comprises a printed circuit board 11 having a plurality of electronic devices 12 and one or more electromagnetic devices 13, such as transformers, thereon. These electronic devices 12 and electromagnetic devices 13 can perform the power-conversion operation. Due to the limited space in the power adaptor, a heat sink assembly for efficiently transferring the heat generated from these electromagnetic devices 13 on the printed circuit board 11 to the case (not shown) of the power adapter is needed. A traditional heat sink assembly generally comprises a first heat-dissipating piece 141 disposed above the electromagnetic device 13 and a second heat-dissipating piece 142 disposed on the edge of the printed circuit board 11 and coupled with the first heat-dissipating piece 141. The first heat-dissipating piece 141 can transfer the heat generated from the electromagnetic device 13 to the second heat-dissipating piece 142 on the edge of the printed circuit board 11. Therefore, the heat generated from the top of the electromagnetic device 13 can be transferred from the interior of the power adapter to the case of the power adapter.

As we known, the printed circuit board 11 is usually made of plastic material so that the printed circuit board 11 is a bad heat conductor. Therefore, when the electromagnetic device 13 which is disposed directly on the printed circuit board 11 works, the heat generated from the bottom of the electromagnetic devices 13 is hard to be dissipated away the printed circuit board 11. Although there is a heat-dissipating piece 141 disposed above the electromagnetic device 13, the heat generated from the bottom of the electromagnetic device 13 is hard to be transferred away the printed circuit board 11 via the first heat-dissipating pieces 141 and the second heat-dissipating piece 142. Therefore, it is unable to overcome the problem of dissipating the heat between the printed circuit board 11 and the electromagnetic device 13. Additionally, it is unavoidable that there will be an air gap formed between the electromagnetic device 13 and the printed circuit board 11 when the electromagnetic device 13 is disposed on the printed circuit board 11. Because the air gap formed between the electromagnetic device 13 and the printed circuit board 11 is also unfavorable for the heat dissipation between the electromagnetic device 13 and the printed circuit board 11, it will result in the partial inequality of temperature inside the power adaptor and influence the operation efficiency of the power adapter.

In view of foregoing problems, what is needed is to develop a heat sink assembly that can transfer the heat generated from the electromagnetic device on the printed circuit board to the case of the power adapter effectively. The present invention can satisfy these needs.

SUMMARY OF THE INVENTION

The object of the present invention is to provide a heat sink assembly for use in an electrical apparatus having a printed circuit board having an electromagnetic device. The heat sink assembly of the present invention can reduce the heat-conduction path for transferring the heat between the electromagnetic device and the printed circuit board to the case of the power adapter, thereby effectively removing heat away the power adapter.

In accordance with an aspect of the present invention, there is provided a heat sink assembly for use in an electrical apparatus having a printed circuit board having an electromagnetic device. The heat heat sink assembly comprises a first heat-dissipating piece disposed between the electromagnetic device and the printed circuit board for transferring the heat generated from the electromagnetic device away the printed circuit board, and a second heat-dissipating piece disposed on the edge of the printed circuit board and contacting with the first heat-dissipating piece for transferring the heat from the first heat-dissipating piece away the printed circuit board.

In an embodiment, the first heat-dissipating piece is integrally formed with the second heat-dissipating piece.

In an embodiment, the heat sink assembly further comprises a third heat-dissipating piece disposed on the top surface of the electromagnetic device for transferring the heat generated from the electromagnetic device away the printed circuit board.

In an embodiment, the heat sink assembly further comprises a fourth heat-dissipating piece disposed on the printed circuit board and contacting with the third heat-dissipating piece for transferring the heat from the third heat-dissipating piece away the printed circuit board.

In an embodiment, the third heat-dissipating piece and the fourth heat-dissipating piece are integrally formed.

In an embodiment, the heat sink assembly further comprises a first isolation medium disposed between the electromagnetic device and the first heat-dissipating piece for isolating the first heat-dissipating piece from the electromagnetic device.

In an embodiment, the first isolation medium is an adhesive tape.

In an embodiment, the heat sink assembly further comprises a second isolation medium disposed between the electromagnetic device and the third heat-dissipating piece for isolating the third heat-dissipating piece from the electromagnetic device.

In an embodiment, the second isolation medium is an adhesive tape.

In an embodiment, the electromagnetic device is a transformer.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention relates to a heat sink assembly. The present invention will now be described more specifically with reference to the following embodiments relating to a heat sink assembly for use in an electrical apparatus such as power adapter. However, the following descriptions of preferred embodiments of this invention are presented herein for purpose of illustration and description only; it is not intended to be exhaustive or to be limited to the precise form disclosed. For example, the concept of the present invention can be applied to a heat sink assembly for use in a power supply, and the electromagnetic device is not limited to the transformer.

Figure 1:
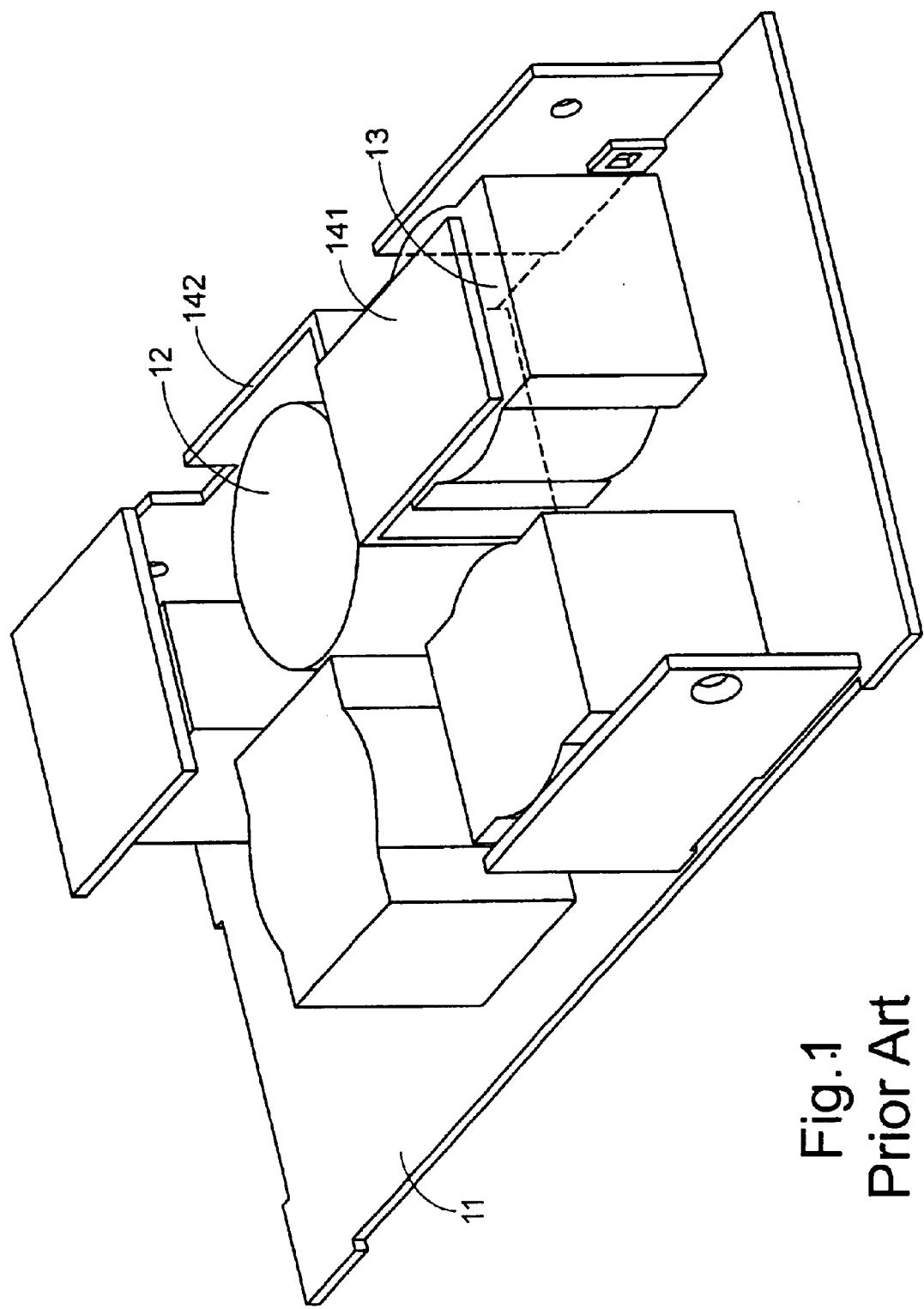
FIG. 1 is a schematically perspective view showing a conventional heat sink assembly disposed on a printed circuit board of a power adapter.
Figure 2:
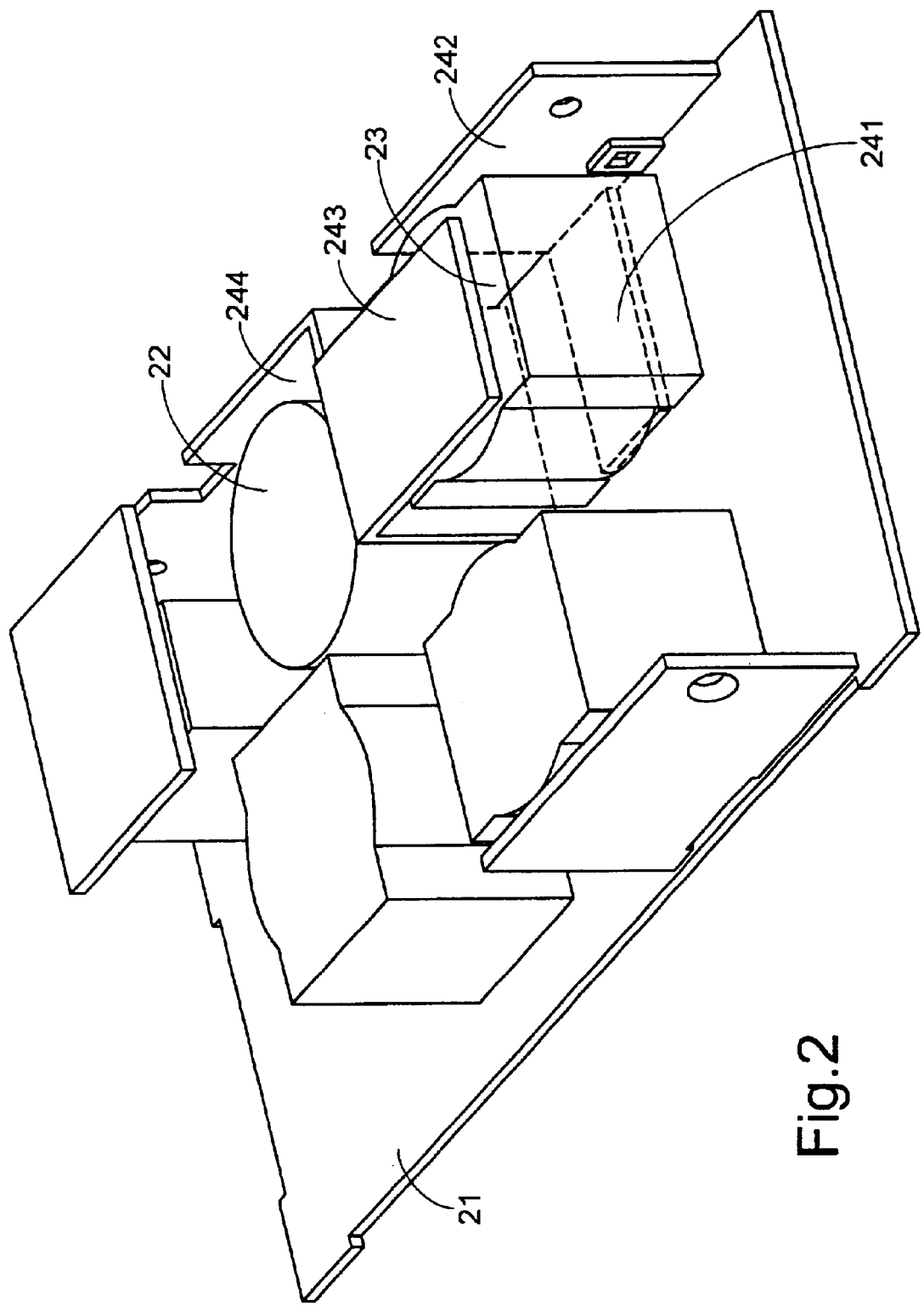
FIG. 2 is a schematically view illustrating a heat sink assembly for use in a power adapter according to a preferred embodiment of the present invention.

Referring to FIG. 2, a heat sink assembly for use in a power adapter according to a preferred embodiment of the present invention is shown. As shown in FIG. 2, the power adapter comprises a printed circuit board 21, a plurality of electronic devices 22, one or more electromagnetic devices 23 and a heat sink assembly. These electronic devices 22 and electromagnetic devices 23 are disposed on the printed circuit board 21 for performing the power-conversion operation.

In this embodiment, the heat sink assembly is employed for transferring the heat generated from the electromagnetic device 23 away printed circuit board 21. The heat sink assembly comprises a first heat-dissipating piece 241 disposed between the electromagnetic device 23 and the printed circuit board 21. The first heat-dissipating piece 241 is employed for transferring the heat between the electromagnetic device 23 and the printed circuit board 21 away the printed circuit board 21, thereby dissipating the heat generated form the bottom of the electromagnetic device 23. Besides the first heat-dissipating piece 241, the heat sink assembly further comprises a second heat-dissipating piece 242 disposed on the edge of the printed circuit board 21 and contacting with the first heat-dissipating piece 241. The second heat-dissipating piece 242 can transfer the heat from the first heat-dissipating piece 241 to the case (not shown) of the power adapter, thereby removing the heat accumulated in the interior of the power adapter to the outside. In this embodiment, the first heat-dissipating piece 241 and the second heat-dissipating piece 242 are integrally formed with each other or coupled with each other by other known method such as soldering.

Besides the first heat-dissipating piece 241 and the second heat-dissipating piece 242, the heat sink assembly further comprises a third heat-dissipating piece 243 disposed on the top surface of the electromagnetic device 23. The third heat-dissipating piece 243 is employed for transferring the heat generated from the electromagnetic device 23 away the printed circuit board 21 along the path above the electromagnetic device 23. In this embodiment, the heat sink assembly further comprise a fourth heat-dissipating piece 244 disposed on the edge of the printed circuit board 21 and contacting with the third heat-dissipating piece 243. The fourth heat-dissipating piece 244 is employed for transferring the heat from the third heat-dissipating piece 243 to the case of the power adapter. Certainly, the third heat-dissipating piece 243 and the fourth heat-dissipating piece 244 can be integrally formed with each other or coupled with each other by known method such as soldering.

Figure 3:
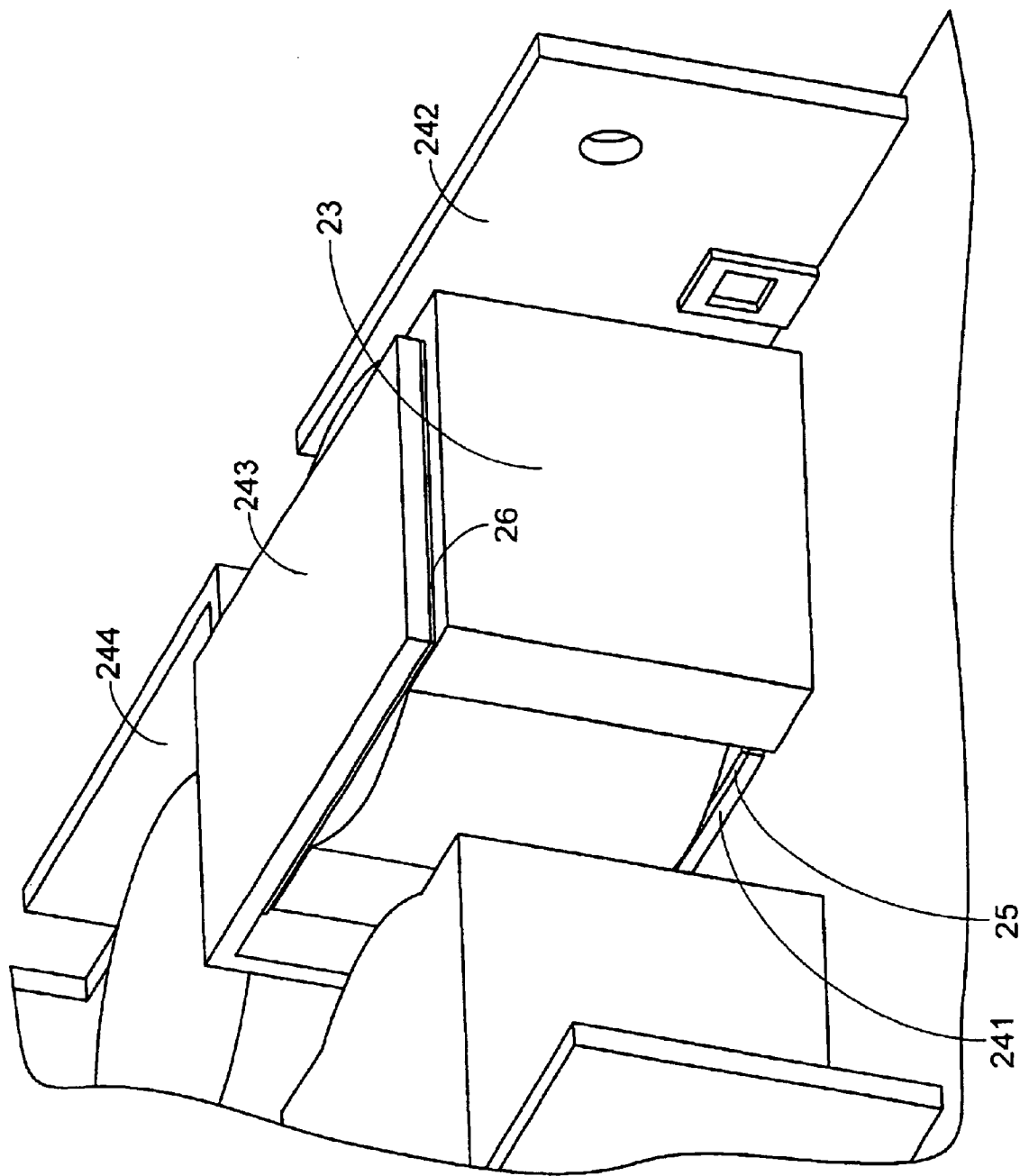
FIG. 3 is a perspective view of the heat sink of FIG. 2.

Please refer to FIG. 3. In order to isolate the first heat-dissipating piece 241 and the third heat-dissipating piece 243 from the electromagnetic device 23, the heat sink assembly optionally comprises a first isolation medium 25 between the first heat-dissipating piece 241 and the electromagnetic device 23 and/or a second isolation medium 26 between the third heat-dissipating 243 and electromagnetic device 23. In this embodiment, the first isolation medium 25 and the second isolation medium 26 can be adhesive tape or other similar isolation material.

From the above descriptions, it is understood that the heat sink assembly of the present invention can effectively transfer the heat between the printed circuit board 21 and the electromagnetic device 23 to the case of the power adapter via the first heat-dissipating piece 241 and the second heat-dissipating piece 242. The heat sink assembly of the present invention can reduce the heat-conduction path of transferring the heat between the electromagnetic device and the printed circuit board to the case of the power adapter and eliminating the air gap between the electromagnetic device and the printed circuit board so that the operation efficiency of the power adapter can be raised.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A heat sink assembly for use in an electrical apparatus having a printed circuit board having an electromagnetic device, said heat sink assembly comprising:

a first heat-dissipating piece disposed between said electromagnetic device and said printed circuit board for transferring heat generated by said electromagnetic device away from said printed circuit board; and a second heat-dissipating piece disposed on the edge of said printed circuit board and contacting said printed circuit board and said first heat-dissipating piece for transferring the heat from said first heat-dissipating piece away from said printed circuit board.

2. The heat sink assembly according to claim 1 wherein said first heat-dissipating piece is integrally formed with said second heat-dissipating piece.

3. The heat sink assembly according to claim 1 wherein said heat sink assembly further comprises a third heat-dissipating piece disposed on the top surface of said electromagnetic device for transferring the heat generated from said electromagnetic device away said printed circuit board.

4. The heat sink assembly according to claim 3 wherein said heat sink assembly further comprises a fourth heat-dissipating piece disposed on said printed circuit board and contacting with said third heat-dissipating piece for transferring the heat from said third heat-dissipating piece away said printed circuit board.

5. The heat sink assembly according to claim 4 wherein said third heat-dissipating piece and said fourth heat-dissipating piece are integrally formed.

6. The heat sink assembly according to claim 3 wherein said heat sink assembly further comprises a first isolation medium disposed between said electromagnetic device and said first heat-dissipating piece for isolating said first heat-dissipating piece from said electromagnetic device.

7. The heat sink assembly according to claim 6 wherein said first isolation medium is an adhesive tape.

8. The heat sink assembly according to claim 3 wherein said heat sink assembly further comprises a second isolation medium disposed between said electromagnetic device, and said third heat-dissipating piece for isolating said third heat-dissipating piece from said electromagnetic device.

9. The heat sink assembly according to claim 8 wherein said second isolation medium is an adhesive tape.

10. The heat sink assembly according to claim 1 wherein said electrical apparatus electromagnetic device is a transformer.

* * * * *